No. 843,594. PATENTED FEB. 12, 1907.
L. A. FLETCHER.
METHOD OF MANUFACTURING GLASSWARE.
APPLICATION FILED JULY 22, 1905.

2 SHEETS—SHEET 1.

WITNESSES

INVENTOR

No. 843,594. PATENTED FEB. 12, 1907.
L. A. FLETCHER.
METHOD OF MANUFACTURING GLASSWARE.
APPLICATION FILED JULY 22, 1905.

2 SHEETS—SHEET 2.

WITNESSES
Walter Samariss
Carrie E. Eggers

INVENTOR
Laurence A. Fletcher
by James K. Bakewell
his attorney

UNITED STATES PATENT OFFICE.

LAWRENCE A. FLETCHER, OF CUMBERLAND, MARYLAND, ASSIGNOR TO NATIONAL GLASS COMPANY, OF PITTSBURG, PENNSYLVANIA, A CORPORATION OF PENNSYLVANIA.

METHOD OF MANUFACTURING GLASSWARE.

No. 843,594.      Specification of Letters Patent.      Patented Feb. 12, 1907.

Application filed July 22, 1905. Serial No. 270,750.

*To all whom it may concern:*

Be it known that I, LAWRENCE A. FLETCHER, of Cumberland, in the county of Allegany and State of Maryland, have invented a new and useful Method of Manufacturing Glassware, of which the following is a full, clear, and exact description, reference being had to the accompanying drawings, forming part of this specification, in which—

Figure 1:
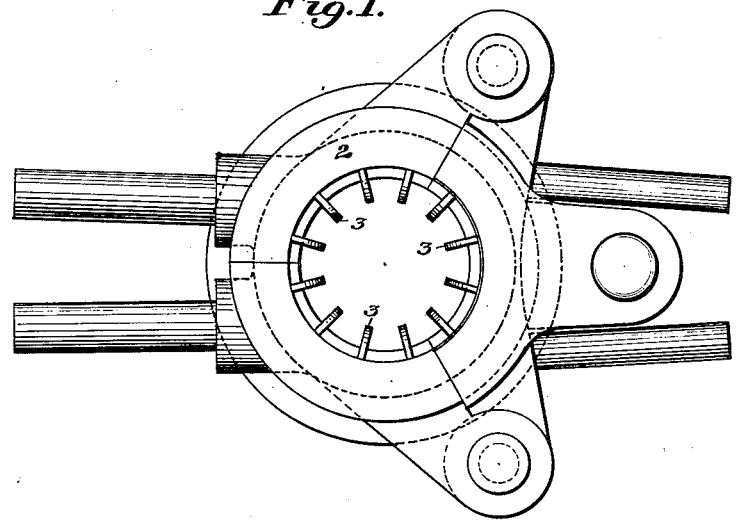
Figure 2:
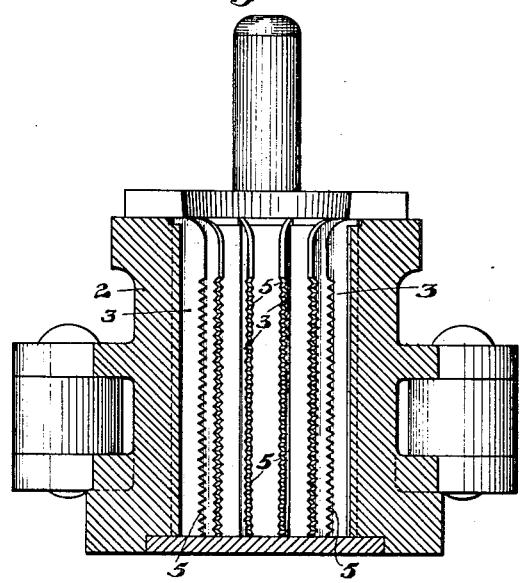
Figure 3:
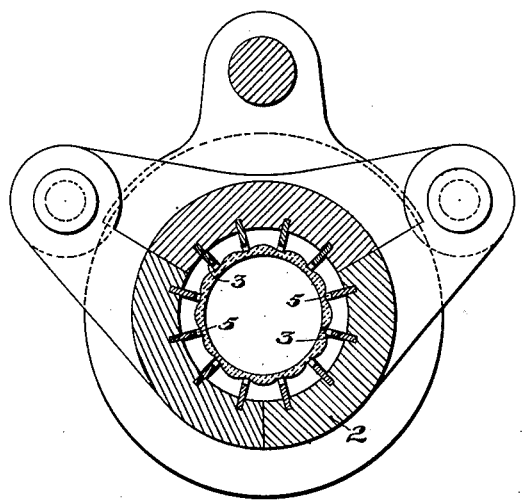
Figure 4:
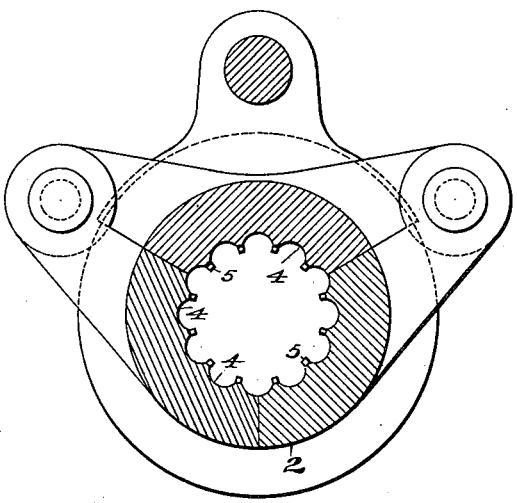
Figure 5:
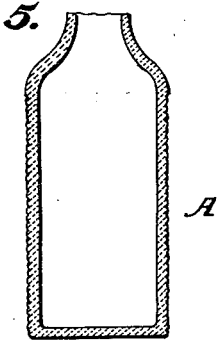
Figure 6:
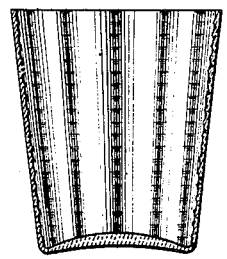
Figure 7:
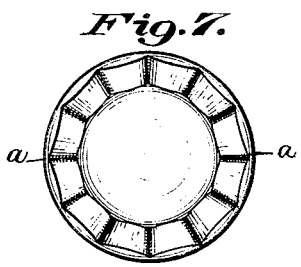

Figure 1 is a plan view of a three-part mold, illustrating a mold by means of which the first step of the method is carried out. Fig. 2 is a vertical sectional view of the same. Fig. 3 is a horizontal sectional view of the same, a glass blank being shown in the mold. Fig. 4 is a horizontal sectional view of a modified form of mold. Fig. 5 is a vertical sectional view of the glass blank after it has been blown in the mold and removed therefrom. Fig. 6 is a vertical sectional view of a finished article of glassware produced by my invention. Fig. 7 is a top plan view of the same.

Like symbols of reference indicate like parts wherever they occur.

My invention relates to a method of manufacturing glassware; and it consists first in producing a glass article having two or more series of ridges or depressions in or on the article and then in smoothing the surface of the article, more or less, whereby different thicknesses of glass and a double optic effect are produced.

I will now describe my invention, using the molds illustrated in the drawings.

The glass-worker first gathers his glass on the end of his punty or blowpipe, or the glass may be gathered by suitable mechanical means, and the plastic glass so gathered is placed in a mold adapted to bring the glass to the shape of the article it is desired to produce and also to form two or more lines or ornamentations on or in the surface or surfaces of the glass article. The molds shown in the drawings are well adapted for this purpose, 2 representing a three-part iron mold adapted to produce a tumbler-blank. Extending radially within the cavity from the inner circumference of the mold are metal ribs 3, which may be keyed to the body of the mold, as shown in Fig. 3, or made integral therewith, as shown in Fig. 4. These ribs may extend vertically from the top to the bottom of the cavity, and between the ribs the cavity of the mold is more or less scalloped, as at 4. These vertical ribs and intervening scallops are designed to produce a series of alternate vertical projections and recesses on the inner and outer faces of the tumbler when the glass is blown in the mold. In order, however, to produce the double optic effect, it is necessary that there be a further and distinct series of indentations or projections, and this in the form of mold shown in the drawings is produced by the saw-teeth or indentations 5, formed on the faces of the vertical ribs 3. Instead of these straight indentations or saw-teeth, curved or angular indentations adapted to produce scrolls or other ornamental figures may be employed. I have illustrated the vertical ribs and the saw-teeth in the drawings as being one of the more simple designs adapted to produce a double optic effect, and I have shown a three-part mold, as it enables the blank to more readily clear the parts of the mold as the blank is removed therefrom.

The plastic glass after it has been gathered and placed in the mold is brought to the shape of a tumbler, having vertical ribs and recesses with indentations on the outer and inner faces of the blank, by blowing in the usual manner, after which the mold is opened and the glass blank is removed therefrom. While the glass is still soft it is placed in a paste mold, where the blank is rotated sufficiently to smooth, more or less, the outer face of the glass, or the inner face of the glass may be more or less smoothed. This smoothing of the glass in the paste mold should be carried to an extent sufficient to smooth the glass and remove the blur and destroy the patterns or designs on the outer face of the glass by the first step of the process, leaving, however, the patterns or designs on the inner face of the glass, and in certain cases, if desired, the patterns on the outer surface of the glass need not be entirely obliterated, but may be left more or less distinct. In either case, as will be understood, the article will be thinner at the portions marked *a*, Fig. 7, than the rest of the article.

Although I have described the use of a metal mold to bring the blank to the desired shape and to form the double series of patterns in the glass, I do not desire to limit myself to the use of such molds, as the glass may be shaped and patterned in certain cases by blowing in the open air and by hand; nor do I desire to limit myself to any particular means for smoothing the surface of the glass and wholly or partially obliterating the designs thereon.

After the second step—that is, the smoothing of the glass—the article is annealed, and where the glass article is a tumbler or like vessel the top shown in Fig. 5 is cracked off and the tumbler is ground and fire-finished, producing the finished article, such as shown in Figs. 6 and 7, having a double optic effect caused by the vertical planes and cross-serrations.

Although I have described my invention as applied to the manufacture of tumblers it may be employed in the manufacture of other articles of glassware, such as finger-bowls, pitchers, decanters, wine-glasses, and other articles for table and other use.

I am aware that it is not new in the manufacture of glassware to cause the glass to bear against vertical ribs during a blowing operation, and I am also aware that it is not new to form serrations and other ornamental designs on the faces of such ribs, and I do not desire to claim the use of such devices, as my invention is not limited thereto.

I claim—

1. The method of manufacturing articles of glassware, consisting in first forming a blank having two or more series of ornamentations on either face of the glass and then smoothing either ornamented face of the glass more or less, substantially as described.

2. The method of manufacturing articles of glassware, consisting in first forming a blank having two or more series of vertical serrated recesses on its outer surface and corresponding vertical serrated ribs on its inner surface, and then smoothing either ornamented surface of the glass more or less, substantially as described.

3. An improvement in the manufacture of articles of glassware, consisting in first forming a double series of indentations on a glass blank by blowing the blank in a suitable mold, and then removing the blank from said mold and smoothing either ornamented surface of the glass more or less by a paste mold, substantially as described.

In testimony whereof I have hereunto set my hand.

LAWRENCE A. FLETCHER.

Witnesses:
ALICE E. DUFF,
CARRIE E. EGGERS.